July 18, 1967 CARMI ARIEL 3,332,063
COMPARISON CIRCUIT
Filed Dec. 16, 1964
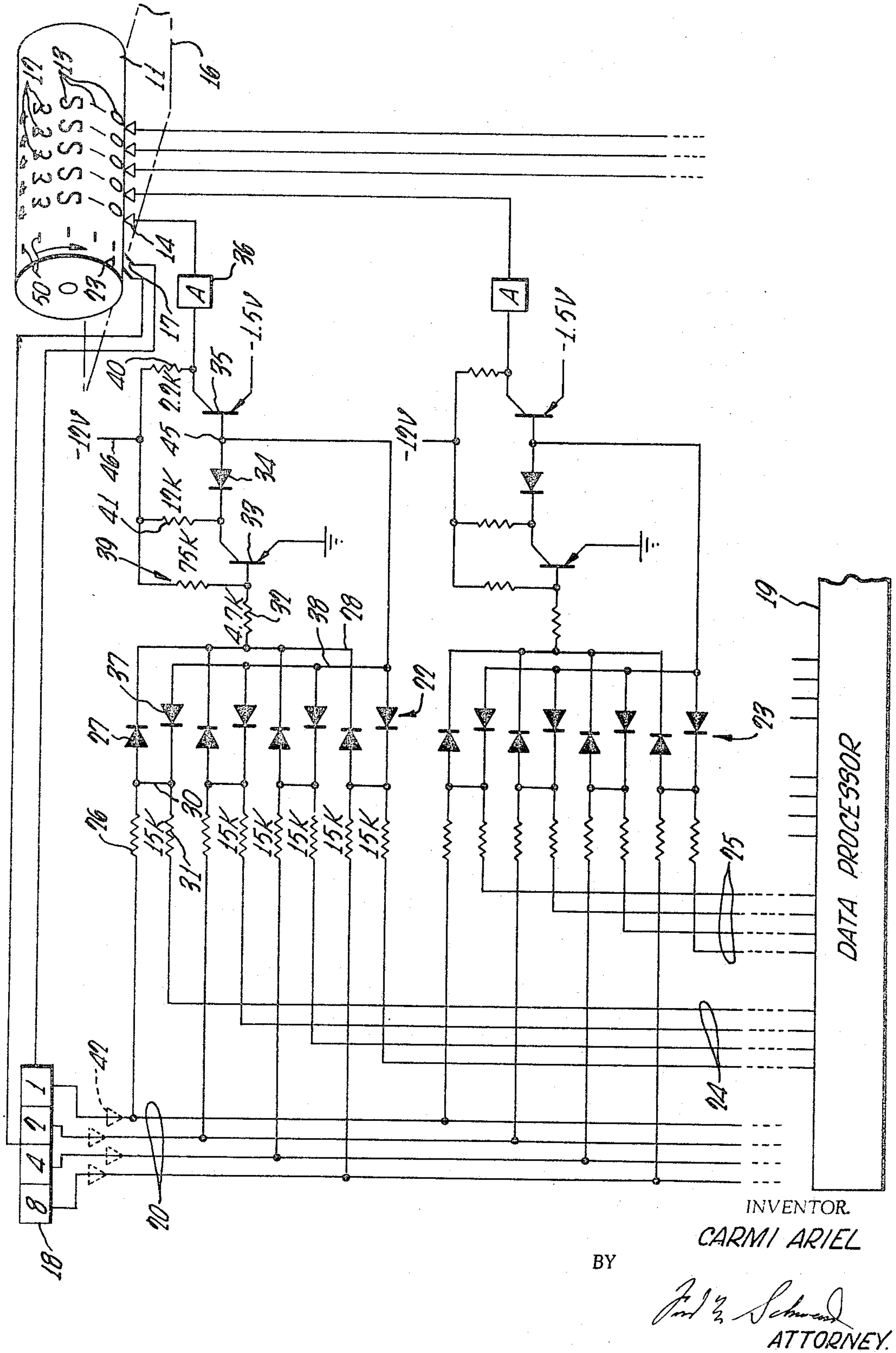
INVENTOR.
CARMI ARIEL
BY
ATTORNEY.

United States Patent Office 3,332,063

Patented July 18, 1967

3,332,063

COMPARISON CIRCUIT

Carmi Ariel, Hollywood, Calif., assignor to Clary Corporation, San Gabriel, Calif., a corporation of California Filed Dec. 16, 1964, Ser. No. 418,845
1 Claim. (Cl. 340—146.2)

ABSTRACT OF THE DISCLOSURE

A comparison circuit for comparing one coded value comprising a combination of positive and zero potenitals with another coded value comprising a combination of negative and zero potentials, and for providing an output signal only when such values are matched.

This invention relates to comparison circuits and has particular reference to a comparison circuit for comparing two coded values.

A principal object of the present invention is to provide a comparison circuit for coded values, such as discreet or binary coded values, to solve the equation $$\overline{AB}+AB=1$$

wherein A and B are of substantially equivalent values but of opposite polarity.

Another object is to provide a comparison circuit of the above type wherein the values being compared may vary considerably in voltage levels relative to each other.

An example of the desirability of such a comparison gate is in the coupling of pieces of electrical equipment, such as a data printer having a binary coded input and a computer having a binary coded output wherein the output of the computer presents the same or a mirrored polarity of voltage combinations.

For example, the printer may require a combination of positive voltages representing binary 1's as a "true" level, and zero voltages representing binary 0's as a "false" level, whereas the computer may produce negative voltages representing binary 1's as a "true" level, and zero voltages representing binary 0's as a "false" level. In such case, and employing the present invention, all that is necessary to make the printer and computer compatible is to apply these levels at the inputs of a comparison gate, and whenever a coincidence occurs, a "true" signal will be produced to effect printing. If the computer produces a positive voltage representing a "true" logic level, and a zero voltage as the "false" logic level, only four polarity inverters are required, one for each bit line, in order to provide a matching capability.

The manner in which the above and other objects of the invention are accomplished will be readily understood on reference to the following specification when read in conjunction with the accompanying drawing, which is a schematic diagram of a wiring circuit for controlling a data printer and embodies a preferred form of the present invention.

The printer in which the invention is embodied is of the type shown, for example, in the patents to Goldberg et al. 2,799,222, issued on July 16, 1957 or Witt et al. 2,915,968, issued on Dec. 8, 1959.

In such printers, a type drum 11 is provided, having a series of circumferentially extending columns 12 of type characters thereabout. Such type characters are arranged in longitudinally extending rows 13, each row contacting like characters. The type drum is continuously rotated about either a fixed or an orbiting axis to successively present the different rows of type characters to a printing line, at which a paper record medium 16 is located.

Aligned with each column 12 is an electromagnetically actuated hammer, indicated diagrammatically by an arrow 14. The hammer, when energized, effects a printing impression from a type character located at the printing line onto the paper 16.

The drum includes a circumferentially extending column of contacts or the like spaced apart distances equal to the spacings of the rows 13. The latter wipe across a brush 17 or the like to step a four-bit binary counter 18 each time a row of type characters passes the printing line. The counter registers in binary coded decimal form a representation of the values of the different type characters as they pass the printing line and this registration is applied as combinations of voltage levels on four output lines 20 in accordance with a predetermined binary scale of progression. That is, the lines represent the different weighted values of 1, 2, 4 and 8 binary coded decimal with the least significant element located at the right, and are thus capable of representing, in combination, different values ranging from 0 to 9 plus other symbols. Such output lines extend across a number of comparison circuits, two of which are generally indicated at 22 and 23, there being one such comparison circuit for each column 12 of type characters.

In accordance with the present invention, data to be printed is received in binary coded decimal form from suitable data processing equipment 19 such as a computing machine, over a number of denominationally arranged sets of lines, two of which are shown at 24 and 25. The lines of each set represent different weighted values in the binary scale of progression and are the same as those represented by the different output lines 20 of the counter.

For the purpose of the present disclosure, a binary 1 is represented on any of the lines of either set 24 and 25 as a +12 volt signal and a binary 0 is represented by zero volts. Such combinations of voltages are maintained on the lines 24 and 25 for the duration of each revolution of the drum. In this case, the circuitry of counter 18 is so arranged that a binary 1 is represented by −12 volts and a binary 0 is represented by zero volts, such voltage levels being of opposite polarity to those registered on the sets of the lines 24 and 25.

Each of the counter output lines 20 is connected, in each columnar comparison circuit, to a resistor 26 which, in turn, is connected through a diode 27 to a line 28 connected in common to similar diodes associated with the other counter output lines. The resistor 26 is also connected through a line 30 and a resistor 31 of similar ohmic value to a similarly weighted line of the associated set of input lines, i.e. 24. Thus, the resistors 26 and 31 form a voltage divider and the cathode of diode 27 is connected to a midpoint of such voltage divider.

Line 28 is connected through resistor 32 to the base of a PNP transistor 33 whose emitter is grounded or tied to a suitable reference voltage and whose collector is connected through a diode 34 to the base of a second PNP transistor 35, whose emitter is biased to −1.5 volts. The collector of the latter transistor is connected through a suitable amplifier 36 which is effective upon an application of an approximately −12 volt signal thereto to energize the associated hammer 14.

The juncture of each line 30 and resistor 31 is connected through a diode 37 to a line 38 connected in common to similar diodes associated with other input lines of the set 24. Line 38 is connected to a point 45 between the cathode of diode 34 and the base of transistor 35.

Thus, the comparison circuit will solve the aforementioned equation $\overline{AB}+AB=1$ where A and B are of equivalent values but of opposite polarity. That is, when a combination of voltage levels on the input lines of set 24 represent a type character instantly located at the printing line, such voltages will be of opposite polarity to those presented by the correspondingly weighted output lines of the counter, and when the zero v ltages presented by certain lines of the set 24 coincide with zero voltages presented by corresponding lines of the counter, the associated hammer will be actuated.

For example, considering the set of input lines 24 to represent 0011 (the decimal value 3), such lines would register +12 volts, +12 volts, zero volts and zero volts, respectively, counting from the right. On the other hand, when the row of type characters representing 3's reaches the printing line, the output lines of the counter would register the voltage levels −12 volts, −12 volts, zero volts and zero volts, respectively, counting from the right. In such case, the net voltage difference across the lines 28 and 38 would be zero. The base of transistor 33 will now be biased negatively from the −12 volt supply 46 through resistor 39, causing the transistor to conduct. Accordingly, the base of the second transistor 35 will be held more positive than the emitter bias level of −1.5 volts, causing such transistor to cut-off or become non-conductive and permitting −12 volts to be applied through a resistor 40 to the amplifier 36 which, as noted before, will effect actuation of the hammer 14.

As the drum continues to present other lines of print, the counter 18 is stepped to present new combinations of voltages to the output lines 20 which, on one hand, will result in a net rise in voltage across one or more of the pairs of resistors 26 and 31 in the comparison circuit, i.e. 22. In such case, the voltage applied to the base of transistor 33 would rise to cut off the latter. Accordingly, −12 volts would be applied through a resistor 41 and diode 34 to render the transistor 35 conductive, well within saturation, thereby preventing firing of the hammer 14.

On the other hand, if a net drop in voltage should occur across any of the resistors 26 and 31, the level of voltage applied to the base of transistor 35 would drop below the emitter bias level, thus causing the latter to conduct, and likewise prevent firing of the hammer.

In the event that it is desired to actuate the printer under control of data processing equipment having a binary coded decimal output wherein a binary 1 is represented by a −12 volts or similar voltage level and a binary 0 is represented by zero volts, it is necessary only to reverse the polarity of the output levels of the counter 18. This can be readily done by insertion of voltage level inverter circuits indicated by the dotted dash lines 42.

It will be noted that with resistor and bias values given, the comparison circuitry will accept relatively wide tolerances in voltage levels without malfunctioning. For example, if the counter output is arranged to present combinations of zero volts and +10 volts and the emitter of transistor 33 is biased +1.5 volts, the negative "true" voltages from the data processing equipment 19 may vary between −6 volts and −12 volts.

In the event NPN transistors are substituted for transistors 33 and 35, all bias polarities must be inverted and all diodes reversely connected from that which is shown in the drawing.

Although the invention has been described herein in detail and certain specific terms and languages have been used, it is to be understood that the present disclosure is illustrative rather than restrictive and that changes and modifications may be made without departing from the spirit or scope of the invention as set forth in the appended claim.

Having thus described the invention, what is desired to secure by United States Letters Patent is:

A comparison circuit for comparing a first combination of positive and zero potentials with a second combination of negative and zero potentials and for producing an output signal when the net sum of respective potentials in both said combinations is at least substantially zero,

- comprising an output signal producing device,
- a plurality of voltage dividers,
- means for applying said potentials of said first combination and said potentials of said second combination to opposite ends of respective ones of said voltage dividers,
- diodes having their cathodes connected to the mid-points of respective ones of said voltage dividers,
- a first common conductor connecting the anodes of said diodes to said device,
- diodes having their anodes connected to the mid-points of respective ones of said voltage dividers, and
- a second common conductor connecting the cathodes of said last mentioned diodes to said device,
- said device being responsive only to at least substantially zero potential on both of said common conductors for producing said output signal.

References Cited

UNITED STATES PATENTS 3,297,986 1/1967 Reardon ---------- 340—146.2

MALCOLM A. MORRISON, *Primary Examiner.*

M. J. SPIVAK, *Assistant Examiner.*